_Patented Aug. 9, 1949_

2,478,378

UNITED STATES PATENT OFFICE 2,478,378

POLYMERS OF N-ACYLAMINOALKYL-ACRYLAMIDE COMPOUNDS

Joseph B. Dickey, Rochester, N. Y., assignor to Eastman Kodak Company, Rochester, N. Y., a corporation of New Jersey No Drawing. Application August 14, 1946, Serial No. 690,589

8 Claims. (Cl. 260—86)

This invention relates to polymeric N-acylaminoalkyl-acrylamide compounds and to a process for their preparation.

In accordance with the invention, I prepare my new resins by homopolymerizing or copolymerizing compounds of the general formula:

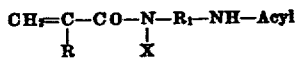

wherein R represents a member of the group consisting of hydrogen, an alkyl group or an acyloxy group, $R_1$ represents a saturated bivalent carbon chain radical of not more than 4 carbon atoms, X represents a member selected from the group consisting of hydrogen, an acyl group or the group —$R_1$—NH—Acyl, and Acyl represents a member selected from the group consisting of the acid radicals of organic carboxylic acids and organic sulphonic acids. More specifically, R can be hydrogen, methyl, ethyl, acetoxy, propionyloxy, butyryloxy, $R_1$ can be a bivalent saturated radical such as ethylene, propylene, isopropylene, butylene, isobutylene, and the like, X can be hydrogen, acetyl, propionyl, butyryl, acylaminoethyl, acylaminopropyl, acylaminobutyl, and Acyl can be acetyl, propionyl, butyryl, benzoyl, benzenesulfonyl, methylsulfonyl, propylsulfonyl or butylsulfonyl. The N-acylaminoalkyl-acrylamide compounds above defined can be prepared, in general, by reacting an acrylylchloride or an alpha-substituted acrylylchloride with the acyl substituted organic diamine in the presence of an inert solvent medium, for example, dry benzene or dioxane. The acyl substituted organic diamine intermediates can be prepared by a number of processes including the general method of condensing an amine with an unsaturated ester such as isopropenyl acetate which is described and claimed in copending application in the name of William P. Utermohlen, Jr., Serial No. 601,917, filed June 27, 1945 (now United States Patent 2,472,633, dated June 7, 1949).

In the preparation of the various copolymers, there can be employed in conjunction with the above defined N-acylaminoalkyl-acrylamides one or more unsaturated, polymerizable organic compounds including, for example, vinyl acetate, vinyl chloride, vinylidene dichloride, isopropenyl acetate, ethylene, isobutylene, vinyl formate, vinyl ethyl ether, styrene, α-methylstyrene, vinyl fluoride, vinyl pyridine, vinyl methyl ketone, methyl isopropenyl ether, methyl isopropenyl sulfone, isopropyl maleate, dimethyl maleate, methyl acrylate, methyl methacrylate, acrylonitrile, α-methacrylonitrile, α-alkoxyacrylonitriles such as α-methoxyacrylonitrile, α-ethoxyacrylonitrile, α-acetoxyacrylonitrile, acrylic acid-N-ethylamide, butadiene-1,3, 1-acetoxybutadiene-1,3, 2-acetoxybutadiene-1,3, 2-cyanobutadiene-1,3, 2-chlorobutadiene-1,3, 2-acetamino butadiene-1,3, and other similar kinds of unsaturated and polymerizable compounds. The polymeric resins of the invention are capable of being spun into filaments, fibers, threads, and cast or formed into valuable films, plastic materials, and the like.

It is accordingly, an object of the invention to provide new polymeric compounds. A further object is to provide a process for preparing such polymers. Other objects will become apparent hereinafter.

The polymerization reactions are promoted by means of heat and the use of catalysts, although satisfactory polymerizations can be obtained by heat polymerization alone. Various methods of polymerization can be carried out, for example, in mass, in emulsions, beads or in solution of an inert liquid such as heptane, benzene, acetic acid, dioxane or water. The temperature range can vary considerably, but the preferred polymerization range is about from 30° to 75° C. Satisfactory resinous products are also obtained with pressures up to and above 100,000 pounds per square inch. In the copolymerization reactions, the reacting ratios of the N-acylaminoalkyl-acrylamide compounds to the unsaturated polymerizable organic compounds are not critical, since copolymeric products of good quality can be obtained employing practically any measurable ratio, the copolymers obtained thereby varying somewhat in properties, in accordance with the amount of the respective groups entering into forming the resin molecule. All such products retain, however, the properties characteristic of the N-acylaminoalkyl-acrylamide grouping. The preferred copolymers of the invention are obtained with starting mixtures having from 5 to 95 molecular parts of the acrylamide compound and from 95 to 5 molecular parts of the selected unsaturated, polymerizable vinyl type compound. Useful products can also be prepared from mixtures wherein the ratios are from 1 to 99 and 99 to 1 molecular parts, respectively. Where a catalyst is employed, it can be an oxygen type, for example, oxygen itself, benzoyl peroxide, acetyl peroxide, urea peroxide, ammonium persulfate, hydrogen peroxide or a non-oxygen type such as boron trifluoride.

The following examples will serve to illustrate our new polymers and the methods of their preparation.

Example 1.—Polymer of N-β-acetaminoethyl-acrylamide 10 grams of N-β-acetaminoethyl-acrylamide having the formula,

CH₂=CH—CO—NH—C₂H₄—NH—COCH₃ prepared by reacting acrylyl chloride in dry benzene at 10° C. with N-acetyl-ethylene diamine, washing with water and flashing off the benzene, were emulsified in 200 cc. of water with Gardinol (sodium salt of lauryl sulfate) and polymerized at about 50° C. with vigorous stirring, using hydrogen peroxide as a catalyst. The latex thus obtained was useful for coating materials, sizing textiles, and the like. The bulk of the latex was precipitated by adding an excess of acetic acid, the polymer so obtained was hard and tough, and capable of being molded into objects or coated into films from its solutions. Related products can be obtained by similar means including polymerized N-β-acetaminoethyl-α - ethacrylamide, N-β-malonicdiamidoethyl - methacrylamide, β-formamidoethyl-acrylamide, N-acetyl-N-β-acetaminoethyl-acrylamide, N-benzenesulfonyl-N-β-benzenesulfonamidoethyl - acrylamide, N-ω-acetamino-β-methylcarbamidopropyl - acrylamide, β-butanesulfonamidoethyl - acrylamide, ω-benzenesulfonamidobutyl-methacrylamide, β - benzoylaminoethyl - acrylamide, β-benzoylaminoethyl-α-acetoxyacrylamide and similar resinous polymers.

Example 2.—Copolymer of β-acetaminoethyl-acrylamide, acrylonitrile and styrene 6 grams of β-acetaminoethyl-acrylamide, 10 grams of styrene and 100 grams of acrylonitrile were mixed together and heated at 50° C., with 0.025 per cent by weight of benzoyl peroxide. When the polymerization was about 20 per cent completed, the catalyst was destroyed and the polymer precipitated by pouring into ethyl ether. The precipitate obtained was dissolved in acetone, the solution poured into water and the precipitate filtered out and dried. The polymer was dissolved in acetone and spun into thread, using the dry spinning technique. The fiber thus prepared can be drafted by pulling in hot air, water or other non-solvents under suitable temperature conditions. Such fibers are tough, elastic and resistant to hot water. In place of styrene, there can be substituted in the above example, α-methyl-styrene, α-acetoxystyrene or methacrylonitrile. Similarly, in place of the amide employed in the above example, there can be substituted β-butanesulfonamidoethyl-acrylamide, prepared by reacting acrylyl chloride with butylsulfonyl-ethylenediamine, or there can be substituted N-bis-ω-acetaminopropyl - acrylamide, prepared by reacting acrylylchloride with NN'-diacetyl-dipropylene triamine. The intermediate butylsulfonyl-ethylenediamine can be obtained by reacting butanesulfonylchloride with ethylenediamine in the presence of aqueous solution of sodium bicarbonate at room temperature, while the N,N'-diacetyl-dipropylenediamine can be obtained by acetylating dipropylenediamine.

Example 3.—Copolymer of N-β-malonicdiamidoethyl-methacrylamide and vinyl acetate 7 grams of N-β-malonicdiamidoethyl-methacrylamide having the formula, CH₂=C(CH₃)—CO—NH—C₂H₄—
NH—CO—CH₂—CONH₂ and 50 grams of vinyl acetate were mixed together, 0.025 per cent by weight of benzoyl peroxide added and the mixture then sealed in a glass tube, until polymerization was complete. The product was worked up by dissolving in acetone and pouring the dope obtained into an excess of water. The purified product was capable of being spun from its solutions into threads and fibers, compression molded by means of heat and pressure, injection molded or coated into sheet materials. The N-β-malonicdiamidoethyl-methacrylamide can be prepared by first making the N-acylethylenediamine by treating malonic methyl ester with ammonia and warming the mono-amide product with ethylene diamine, then reacting the acyl substituted diamine with methacrylyl chloride. In place of vinyl acetate in the above example, there can be substituted vinyl formate, isopropenyl acetate, to obtain related products. Similarly in place of the amide employed in the above example, there can be substituted ω - benzenesulfonylamidobutyl - acrylamide obtainable by reacting benzenesulfonyl chloride with butylene diamine, and then reacting the substituted amine so obtained with acrylyl chloride. The proportions of the acrylamide compound and the vinyl acetate which can be employed in the starting polymerization mixtures can be varied within wide limits and still obtain valuable polymerized products from such mixtures. While the proportion of vinyl acetate has been given in the example as roughly seven times the amide in quantity, good products can also be obtained with polymerization mixtures containing from 1 to 99 molecular parts of vinyl acetate and 99 to 1 molecular parts of N-β-malonicdiamidoethyl-methacrylamide.

Example 4.—Copolymer of β-formamidoethyl-acrylamide, vinylidene dichloride and vinyl chloride 10 grams of β-formamidoethyl-acrylamide having the formula,

CH₂=CH—CO—NH—C₂H₄—NH—CHO prepared by reacting acrylyl-chloride with formyl-ethylene diamine, 97 grams of vinylidene dichloride and 6 grams of vinyl chloride were copolymerized together, using a small amount of benzoyl peroxide as a catalyst. The polymerization can be carried to completion or interrupted at any desired stage by precipitation of the reaction mixture into an excess of ether. The product so obtained can be spun from a suitable solvent or from a melt to give fibers of value for the making of textiles. In place of vinylidene dichloride, there may be substituted in the above example, vinylidene chlorofluoride or vinylidene difluoride. The intermediate formyl-ethylene diamine can be prepared by reacting methyl formate with ethylene diamine.

Example 5.—Copolymer of N-acetyl-N-β-acetaminoethyl-acrylamide and methylmethacryloxyacetate 20 grams of N-acetyl-N-β-acetaminoethyl-acrylamide having the formula,

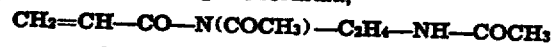
CH₂=CH—CO—N(COCH₃)—C₂H₄—NH—COCH₃ prepared by acylating ethylene diamine and reacting acylated amine with acrylyl chloride, and 100 grams of methyl methacryloxyacetate were mixed together and copolymerized at 50° C., using benzoyl peroxide as a catalyst. When the polymerization was complete, the product was purified by reprecipitation from acetone. The hard and tough resin so obtained was suitable for the preparation of films, molded products and fibers.

In place of methyl methacryloxyacetate, there can be substituted in the above example, methyl acrylate, methyl methacrylate or ethyl acrylate.

*Example 6.—Copolymer of N-benzenesulfonyl-N-β-benzenesulfonamido - ethyl - acrylamide, vinylmethylketone and vinylmethylsulfone*

10 grams of N-benzenesulfonyl-N-β-benzenesulfonamido-ethyl-acrylamide having the formula,

prepared by reacting acrylyl chloride with N,N'-dibenzenesulfonyl-ethylene diamine, were mixed with 10 grams of vinylmethylketone and 10 grams of vinylmethylsulfone and copolymerized in an autoclave under 4,000 pounds per square inch of pressure for 15 hours. the temperature being slowly raised from 20° C. to about 180° C. When polymerization was complete, the product was removed. It was capable of being molded, coated into films and spun into threads from its solutions or melts. A similar product can be obtained by carrying out the polymerization in a water dispersion. The intermediate N,N'-dibenzenesulfonylethylenediamine can be obtained by reacting 2 moles of benzenesulfonylchloride with 1 mole of ethylene diamine in the presence of aqueous sodium hydroxide. In place of the vinyl monomers, there can be substituted in the above examples, methyl-isopropenyl ketone, methyl-isopropenylsulfone or vinyl sulfonamide.

*Example 7.—Copolymer of β-acetaminoethyl-acrylamide and 2-acetamino-butadiene*

10 grams of β-acetaminoethyl-acrylamide and 10 grams of 2-acetamino-butadiene were copolymerized at 60° C., using benzoyl peroxide as a catalyst. The polymer after purification was capable of being molded, coated into films and other sheeting materials.

*Example 8.—Copolymer of N-ω-acetamino-β-methylcarbamidopropyl-acrylamide and ethylene*

5 grams of N-ω-acetamino-β-methylcarbamidopropyl-acrylamide having the formula,

prepared by reacting acrylylchloride with N-acetyl-β-methylcarbamido-propylene diamine were placed in a 100 c. c. capacity autoclave, and ethylene pumped in, until a pressure of 3,000 atmospheres was reached. The autoclave was then closed and heated to 180° C. for a period of about 20 hours. The polymer after purification was hard and tough and capable of being spun into fibers, molded into objects or coated into sheet materials and films. In place of ethylene, there can be substituted in the above example, propylene, iso-butylene, cyclohexene to obtain closely related products.

*Example 9.—Copolymer of β-acetaminoethyl-acrylamide, dimethyl fumarate and diethyl fumarate*

10 grams of β-acetaminoethyl-acrylamide, 50 grams of dimethyl fumarate, 50 grams of diethyl fumarate, 0.5 gram of benzoyl peroxide, 500 c. c. of water and 1.25 grams of gum arabic were placed in a bottle, allowing about 10 per cent free space, and tumbled at about 50 R. P. M. and at a temperature of about 50° C. When polymerization was complete, the polymer in the form of beads was removed, washed with water and dried at about 50° C. The product was a colorless, tough resin capable of being molded into shapes, spun into fibers and coated into sheet materials. The polymerization can also be carried out in a suitable rotating autoclave under super atmospheric pressure up to about 4,000 atmospheres.

*Example 10.—Copolymer of mixed N-acrylaminoethyl-acrylamides*

25 grams of N-β-acetaminoethyl-acrylamide, 25 grams of N-β-acetaminoethyl-methacrylamide and 25 grams of N-β-benzoylaminoethyl-α-acetoxyacrylamide were mixed together and copolymerized using benzoyl peroxide as a catalyst. The product obtained was a hard, tough resin capable of being molded, spun or coated into films. The proportions employed in the above example can be varied within wide limits, for example, valuable products can be obtained with mixtures wherein each of the mentioned acrylamides can range from 1 to 25 grams.

What I claim is:

1. A polymer derived by polymerization of a compound having the general formula:

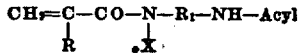

wherein R represents a member selected from the group consisting of hydrogen, a methyl group, an ethyl group and an acyloxy group of a saturated fatty acid of not more than 4 carbon atoms, R₁ represents a saturated bivalent hydrocarbon radical selected from the group consisting of 2, 3 and 4 carbon atom radicals, X represents a member selected from the group consisting of hydrogen, an Acyl group and the group

and Acyl represents the acid radical of an organic acid selected from the group consisting of a saturated fatty acid of not more than 4 carbon atoms, a benzene carboxylic acid, a saturated alkylsulfonic acid of not more than 4 carbon atoms and a benzene sulfonic acid.

2. A copolymer derived by polymerization of a mixture comprising from 1 to 99 molecular parts of a compound having the general formula:

wherein Acyl represents the radical of a saturated alkylsulfonic acid of not more than 4 carbon atoms and from 99 to 1 molecular parts of acrylonitrile.

3. The process which comprises heating in the presence of a polymerization catalyst a compound having the general formula:

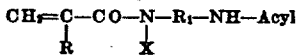

wherein R represents a member selected from the group consisting of hydrogen, a methyl group, an ethyl group and an acyloxy group of a saturated fatty acid of not more than 4 carbon atoms, R₁ represents a saturated bivalent hydrocarbon radical selected from the group consisting of 2, 3 and 4 carbon atom radicals, X represents a member selected from the group consisting of hydrogen, an Acyl group and the group

and Acyl represents the acid radical of an organic acid selected from the group consisting of a saturated fatty acid of not more than 4 carbon atoms, a benzene carboxylic acid, a saturated alkylsulfonic acid of not more than 4 carbon atoms and a benzene sulfonic acid.

4. A copolymer derived by polymerization of a mixture comprising from 1 to 99 molecular parts of a compound having the general formula:

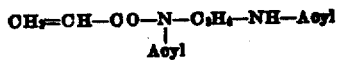

wherein each Acyl represents the acid radical of a saturated fatty acid of not more than 4 carbon atoms and from 99 to 1 molecular parts of methyl methacrylate.

5. A copolymer derived by polymerization of a mixture comprising from 1 to 99 molecular parts of a compound having the general formula:

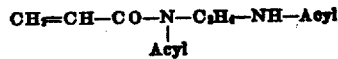

wherein each Acyl represents the acid radical of a benzene sulfonic acid and from 99 to 1 molecular parts of vinyl methyl ketone.

6. A process which comprises heating in the presence of a polymerization catalyst a mixture of from 1 to 99 molecular parts of a compound having the general formula:

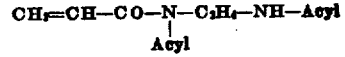

wherein each Acyl represents the acid radical of a saturated fatty acid of not more than 4 carbon atoms and from 99 to 1 molecular parts of methyl methacrylate.

7. A process which comprises heating in the presence of a polymerization catalyst a mixture of from 1 to 99 molecular parts of a compound having the general formula:

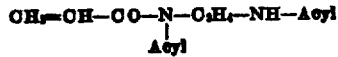

wherein each Acyl represents the acid radical of a benzene sulfonic acid and from 99 to 1 molecular parts of vinyl methyl ketone.

8. A process which comprises heating in the presence of a polymerization catalyst a mixture of from 1 to 99 molecular parts of a compound having the general formula:

wherein Acyl represents the acid radical of a saturated alkylsulfonic acid of not more than 4 carbon atoms and from 99 to 1 molecular parts of acrylonitrile.

JOSEPH B. DICKEY.

REFERENCES CITED

The following references are of record in the file of this patent:

UNITED STATES PATENTS

| Number | Name | Date |
|---|---|---|
| 2,288,197 | Kranzlein et al. | June 30, 1942 |